United States Patent [19]
van Zijverden

[11] Patent Number: 4,751,941
[45] Date of Patent: Jun. 21, 1988

[54] HOT WATER TANK FOR USE IN BEVERAGE DISPENSING MACHINES

[75] Inventor: Willem van Zijverden, Lübeck, Fed. Rep. of Germany

[73] Assignees: Dagma Deutsche Automaten; Getranke- Maschinen GmbH & Co. KG, both of Reinfeld, Fed. Rep. of Germany

[21] Appl. No.: 908,022

[22] Filed: Sep. 16, 1986

[30] Foreign Application Priority Data

Sep. 26, 1985 [DE] Fed. Rep. of Germany ......... 353263

[51] Int. Cl.⁴ .............................................. A47J 27/00
[52] U.S. Cl. ................................. 137/587; 137/527.8; 126/389
[58] Field of Search ............................... 126/383, 389; 137/527.8, 587

[56] References Cited

U.S. PATENT DOCUMENTS

| | | | |
|---|---|---|---|
| 157,747 | 12/1874 | Fromlet | 126/389 |
| 412,455 | 10/1889 | Bodenstein | 126/389 |
| 452,901 | 5/1891 | Austin | 126/389 |
| 475,678 | 5/1892 | Dexter | 126/389 |
| 1,065,191 | 6/1913 | Trentowsky | 126/389 |

Primary Examiner—A. Michael Chambers
Attorney, Agent, or Firm—Karl F. Ross; Herbert Dubno

[57] ABSTRACT

A hot water tank is provided for use in beverage dispensing machines which comprises a cover, a discharge valve for hot water, an inlet valve for fresh water, a heating system, controlling means for observing water temperature and water level, an overflow opening communicating with the atmosphere, and an overflow edge extending between the cover and the water level along an external wall of the tank. The overflow opening is covered by means of an automatically closing valve element in the form of a plate. One side of the valve element is swingably fastened to the cover. There is also a ventilating hole provided in the cover, the hole being substantially smaller than the overflow opening.

4 Claims, 1 Drawing Sheet

HOT WATER TANK FOR USE IN BEVERAGE DISPENSING MACHINES

FIELD OF THE INVENTION

This invention relates to a hot water tank for use in beverage dispensing machines.

BACKGROUND OF THE INVENTION

Hot water tanks may be provided in the form of pressure tanks (cf. U.S. Pat. No. 1,468,527). Such type of pressure sealed hot water tanks require a safety valve. In the prior known case, the safety valve is associated with the lid or cover of the hot water tank. Any failure of the safety valve will result in dangerous excess pressures. In addition, the variations in pressure can be only restricted in a very unsatisfactory manner with the aid of a safety valve and expensive and time-consuming measures will be necessary to avoid pressure variations at all. Variations in pressure in a hot water tank, though, will impair the dosing of the beverage dispensing machine the hot water tank is associated with.

Further counted among prior art are closed low-pressure systems in the case of which the top area is in communication with a separate expansion vessel wherein surplus water is accumulated. The expansion vessel, therefore, requires to be drained regularly. Hot water tanks of such type are expensive as to construction and, above all, require a lot of space which renders assembly into beverage dispensing machines difficult. To ensure accurate dosage they further require an expensive and time-consuming pressure or volume control.

In addition, low-pressure operated hot water tanks are known which are virtually open or are closed by means of a loose cover only so that pressure compensation may take place between the top area and the external atmosphere. No dangerous modes of operation will occur in such type of hot water tank. Accurate dosage will be possible with the aid of simple means, since variations in pressure normally will not have to be expected. The space requirement of such type of hot water tank is small as well, the hot water tank being operated at temperatures ranging between approximately 80° and approximately 95°. When the top area is covered or closed by means of the lid steam losses are kept low and the contents of the hot water tank is largely prevented from being contaminated. The top area of the hot water tank includes a water overflow port associated with a drain passage exteriorly secured to the tank wall. Upon failure in the liquid level control, surplus water may consequently be discharged. Moreover, in cases where the boiling point is reached due to, for instance, irregularities in temperature control, any excess pressures occurring as a consequence of the generated steam are eliminated. The steam—which is present also during normal operation—can escape via the external drain passage, condenses in said passage and, as dripping water, is then collected, for instance, by means of a dripping water collecting bowl. The collected dripping water is then again caused to evaporate from the collecting bowl by means of a ventilating device and/or an additional heating system.

The overflow edge of the overflow port or opening is spaced from the normal liquid level to allow the water reservoir in the hot water tank to expand accordingly upon heating without any water being lost. The overflow opening is so dimensioned that even when difficulties arise in supplying water, water will be prevented from penetrating into the cover region because electrical components are positioned in this region in most cases. This means that the overflow opening requires to be many times greater than is necessary for the pure pressure compensation between ambient atmosphere and top area of the hot water tank. The large dimension of the overflow opening has the effect that relatively great amounts of steam continuously escape—and this means, a correspondingly high loss in energy at the same time. In beverage dispensing machines of the type in question and of normal size, losses in condensation water may amount up to 300 ml and more per day.

OBJECT OF THE INVENTION

It is an object of the present invention to essentially reduce the condensate and energy losses while the free pressure compensation between hot water tank interior and external atmosphere is maintained, to lessen the space requirement of the hot water tank within the beverage dispensing machine and to simplify the structural design of the hot water tank.

SUMMARY OF THE INVENTION

A hot water tank is provided for use in beverage dispensing machines which comprise a cover, a discharge valve for hot water, an inlet valve for fresh water, a heating system, controlling means for observing a water temperature and a water level and an overflow opening in communication with the atmosphere. There is also an overflow edge extending between the cover and the water level along the external wall of the tank. The overflow opening is covered by means of an automatically closing valve element in the form of a plate. One side of the valve element is swingably fastened to the cover. Very importantly, there is also a ventilating hole provided in the cover.

Under normal operation conditions the plate, which automatically covers the overflow opening, keeps the overflow opening covered at a very low locking pressure. Consequently, even in cases where the overflow opening has large dimensions steam losses and, thus, energy losses are kept extremely low. On the other hand, the overflow opening may be dimensioned large enough to guarantee a rapid and safe discharge of steam and/or water when irregular modes of operation occur. The permanently open ventilating hole provided in the cover ensures that differences in pressure appearing during normal operation between the tank interior and the external atmosphere can be compensated quickly enough to guarantee an accurate dosage in the dispensing machine independent of any variations in pressure. The amounts of steam and energy issuing from the relatively small ventilating hole are extremely small and, therefore, can be ignored.

Consequently, no dripping water or only a minor amount thereof is generated which normally evaporates and, therefore, neither collecting bowls nor heating systems or ventilating devices are required to evaporate the dripping water. Hence, the new structural design of the hot water tank embodies a simplification of the structural design and a reduction in space requirement.

A particularly simple structural design of the valve element involves constructing the plate of the valve element from a soft plastic material. Advantageously tha plate is formed integral with an edge section used for the fastening operation. With this arrangement there results the desired minor locking pressure.

Furthermore it is desirable to have the edge section formed as an enlarged ridge connected with the cover in an easily detachable manner through plug-and-socket-type connection portions. This type of design renders the fastening of the valve element less difficult.

Another preferred feature of the invention is the positioning of the valve plate including the fastening edge section at the cover in a direction inclined downwardly towards the overflow edge of the overflow opening. This permits a sufficiently large overflow opening to be obtained. Moreover, the overflow edge is thereby sufficiently spaced apart from the cover.

A further advantageous structural adaptation involves providing the valve plate, which is in spaced apart relation from its area resting on the overflow edge of the overflow opening, with a downwardly projecting drip web. This feature lessens water losses at the obliquely extending valve plate. A good and tight sealing will thereby be obtained with the force exerted onto the valve plate being nevertheless small.

Tests have shown that the steam and energy losses can be considerably reduced. For instance, the steam loss under comparable conditions could be restricted to an amount of approximately 30 ml or even less per day due to the new structural design.

BRIEF DESCRIPTION OF THE INVENTION

In the following, one embodiment of the invention shall be described in detail on the basis of schematic drawings, wherein.

SPECIFIC DESCRIPTION

Figure 1:
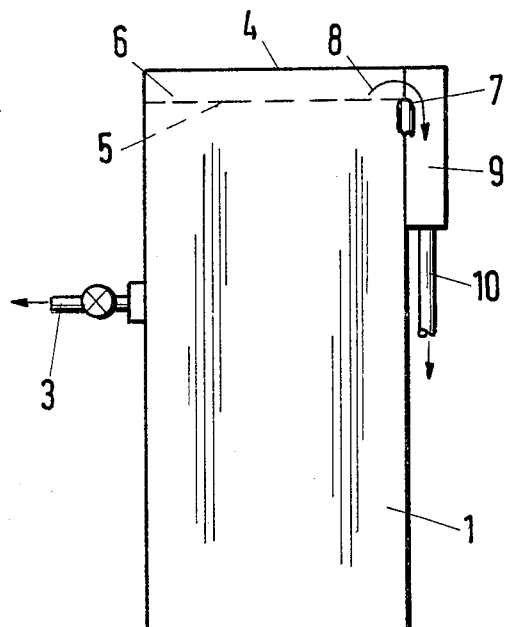
FIG. 1 shows a side view of the hot water tank according to the invention.

The hot water tank 1 is designed as a low-pressure vessel and includes a top area to allow free pressure compensation between said top area and the external atmosphere. The hot water tank is used for insertion into a beverage dispensing machine which has not been shown and may be connected to the hot water system of the dispensing machine. In the bottom of hot water tank 1 there is provided an inlet valve 2 for cold fresh water. In spaced apart relation from the bottom a discharge valve for hot water is provided in the hot water tank wall. Furthermore, controlling means are provided in the interior of the hot water tank for the purpose of observing and maintaining a predetermined water temperature and a predetermined water level. These controlling means are not shown.

Above the usual water level, there is provided the top area upwardly covered by means of a lid or cover. In spaced apart relation from the normal water level and from the cover 4 an overflow opening 11 is provided in the wall of the hot water tank 1, said overflow opening having an overflow edge 7 extending between cover and water level at the exterior wall of the tank and determining the maximum water level 5 in the hot water tank 1. Overflow opening 11 is followed by a drain passage 9 which is exteriorly secured to the hot water tank 1 and which may extend up to a drain point, for example, through a hose 10.

Upon excessive water supply, for example, occurring in water level control or at inlet valve 2, surplus water may drain via overflow edge 7 as indicated by arrow 8 in FIG. 1. For this purpose, the overflow opening 11 is to be of a sufficiently large dimension so that the water does not penetrate into the cover region and, thus, is prevented from reaching the electrical components positioned in this region. Steam generated in the top area may escape through the overflow opening 11 as well, particularly, in cases where the boiling point is reached following the occurrence of malfunctions in the controlling operation.

Figure 2:
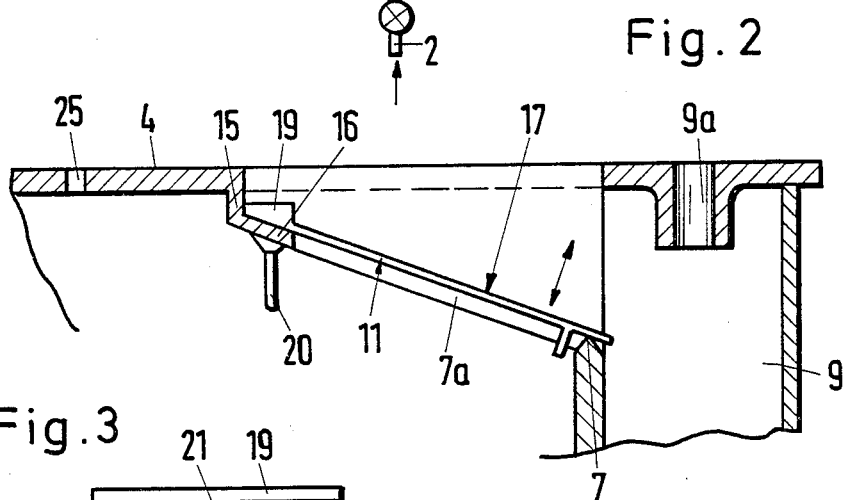
FIG. 2 shows an enlarged and vertically taken sectional view of a detail of the hot water tank in the area where the overflow opening is disposed.
Figure 3:
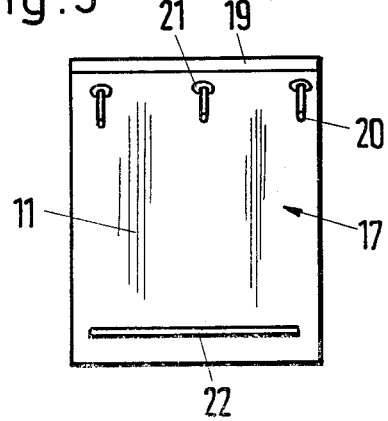
FIG. 3 is a view from the bottom onto the valve element employed for covering the overflow opening according to FIG. 2
Figure 4:
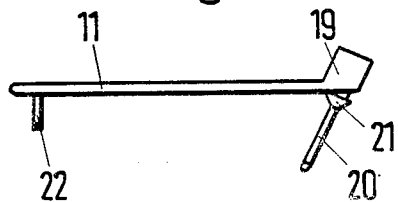
FIG. 4 is a side view of the valve element according to FIG. 3.

As illustrated in FIG. 2, the overflow opening 11 connecting the top area 6 with the external atmosphere is located in cover 4. For this purpose—according to FIG. 2—the cover 4 includes a wall portion 15 defining the overflow opening 11 on three sides and projecting downwardly.

The wall portion 15, a sectional view of which is shown in FIG. 2, is abutted by a fastening portion 16 extending obliquely downwardly in a direction toward the overflow edge 7 and being integrally formed with the lateral wall portions. These two lateral wall portions 15 respectively comprise knife-shaped supporting faces 7a extending obliquely downwardly and, at the bottommost point, smoothly change into the overflow edge 7 designed as supporting face edge.

A valve element 17 is employed for covering the overflow opening 11. This valve element consists of a thin valve plate 18 of soft plastic material and, thus, is of high flexibility. Valve plate 18 is associated with the overflow opening in such a manner that is rests on the three knife-shaped supporting faces 7a and 7 in slightly prestressed fashion and, thus, covers the overflow opening 11 from the top. Valve plate 18 may, for example, be made of silicone rubber. To attach the valve plate 18 to the fastening portion 16 of the cover, the valve element 17 includes in its upper edge area a fastening edge section 19 formed into a ridge and being in flat contact with fastening portion 16. The fastening edge section 19 is integrally formed with the valve plate 18. At the bottom face of said fastening edge section 19 there are provided a plurality of downwardly projecting plug-and-socket-type connection portions each consisting of a downwardly extending pin 20 having a reinforced section 21. These plug-and-socket-type connection portions may be inserted from the top in associated bores formed in the fastening portion 16 to finally snap into locking position. It is, thus, easy to assemble the valve element 17 and exchange it if need arises. In spaced apart relation from the overflow opening 11 the cover is provided with a ventilating hole having a small cross-section, said ventilating hole ensuring a permanent compensation communication between the top area 6 of the hot water tank 1 and the external atmosphere so that even in the closed condition of valve element 17 no differences in pressure can occur between the top area 6 and the external atmosphere. Only minor amounts of steam can escape through this hole.

Upon malfunctions of the means controlling temperature and water supply, respectively, even greater amounts of surplus water or surplus steam may rapidly and safely escape through the overflow opening into the external drain passage 9 by lifting the valve plate 18.

Any steam condensing at the bottom face of the valve plate is re-supplied into the interior of the hot water tank via a drip web 22 provided at the bottom face of the valve plate 18 in slightly spaced and parallel relation to the overflow edge 7.

The minor amounts of steam escaping during normal operation may be caused to evaporate in a sufficiently rapid manner by means of the normal ventilating system outside of the hot water tank and, consequently, there is no dripping water during normal operation and, thus, need not be collected.

I claim:

1. A hot water tank for use in beverage dispensing machines: comprising
    a tank body provided with a cover;
    a discharge valve on said tank body for hot water;
    an inlet valve on said tank body for fresh water;
    a heating system in said tank body;
    controlling means for monitoring a water temperature and a water level in said tank body;
    means forming an overflow opening in communication with the atmosphere and including an overflow edge extending between said cover and said water level along an external wall of the tank body; and
    an automatically closing valve element in the form of a plate covering said overflow opening, said overflow opening and plate being positioned obliquely with respect to said cover, one side of said valve element being swingably fastened to the cover, a ventilating hole being provided in said cover and being substantially smaller than said overflow opening, said one side of said valve element being constituted as a fastening edge section at said cover, said valve plate being inclined downwardly toward the overflow edge of the overflow opening, the edge of the overflow opening cooperating with the valve plate being provided in the form of a supporting face edge, said supporting face edge being positioned completely inward of a drain passage exteriorly secured to said tank body.

2. The hot water tank defined in claim 1 wherein said plate of said valve element is made of a soft plastic material and is formed integrally with said fastening edge section joining said valve element to said cover.

3. The hot water tank defined in claim 2 wherein said fastening edge section is formed as an enlarged ridge connected with said cover by a readily detachable plug-and-socket connection.

4. The hot water tank defined in claim 1 wherein said plate of said valve element is formed with an downwardly projecting drip web spaced from its supporting face edge.

* * * * *